(12) United States Patent
Kapse (10) Patent No.: US 10,303,786 B2
(45) Date of Patent: May 28, 2019

(54) RETRIEVING AND DISPLAYING DATA FROM A COLUMNAR DATABASE

(71) Applicant: International Business Machines Corporation, Armonk, NY (US)

(72) Inventor: Apoorv Kapse, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 14/818,535

(22) Filed: Aug. 5, 2015

(65) Prior Publication Data

US 2017/0039280 A1   Feb. 9, 2017

(51) Int. Cl.
*G06F 17/30* (2006.01)

(52) U.S. Cl.
CPC .. *G06F 17/30315* (2013.01); *G06F 17/30345* (2013.01)

(58) Field of Classification Search
USPC ........................................................ 707/661
See application file for complete search history.

(56) References Cited

U.S. PATENT DOCUMENTS

| | | | |
|---|---|---|---|
| 5,706,505 A | 1/1998 | Fraley et al. | |
| 5,835,904 A | 11/1998 | Vicik et al. | |
| 6,598,041 B1 * | 7/2003 | Bernal | G06F 17/30595 |
| 8,548,986 B2 | 10/2013 | Surna et al. | |
| 8,626,725 B2 | 1/2014 | Netz et al. | |
| 2009/0233623 A1 * | 9/2009 | Johnson | H04W 4/02 455/456.3 |
| 2010/0069035 A1 * | 3/2010 | Johnson | H04W 4/02 455/404.1 |
| 2013/0124483 A1 * | 5/2013 | Furuhashi | G06F 17/30315 707/661 |
| 2014/0317084 A1 | 10/2014 | Chaudhry et al. | |
| 2014/0379737 A1 | 12/2014 | Odenheimer et al. | |

FOREIGN PATENT DOCUMENTS

WO    2014122441 A1    8/2014

OTHER PUBLICATIONS

"ColumnwiseMRI CLI/ODBC configuration keyword", http://www-01.ibm.com/support/knowledgecenter/api/content/nl/en-us/S . . . , accessed from internet Aug. 4, 2015, 1 page.

* cited by examiner

*Primary Examiner* — Sana A Al-Hashemi
(74) *Attorney, Agent, or Firm* — Robert Bunker; Edell, Shapiro & Finnan, LLC (57) ABSTRACT

A query is made at a computing device for generating a result-set. The result-set may comprise data selected from a database in response to the query. One or more cursors is associated with the result-set received in response to the query. The result-set is retrieved based on the one or more cursors. In one embodiment, the result-set may be retrieved in a columnar fashion.

12 Claims, 5 Drawing Sheets

RETRIEVING AND DISPLAYING DATA FROM A COLUMNAR DATABASE

BACKGROUND

1. Technical Field

Present invention embodiments relate to data processing and, more particularly, to using cursors to retrieve and display data from columnar databases.

2. Discussion of the Related Art

Generally, a database is a structured collection of data and metadata that is stored on one or more storage devices. The data within the database may be logically organized according to a variety of data models, depending on the implementation. In one such example, a relational database, data is generally organized as a set of tables, wherein each table may comprise of a set of rows and columns. Each row represents a distinct object and each column represents a distinct attribute.

A Database Management System (DBMS) is a software system that controls access to the data in the database. The DBMS is configured to receive and process a variety of database commands, referred to as queries. One example of a query language for managing data in the relational database is Structured Query Language (SQL). Data is generally transmitted over a network in a row format. Even in a columnar database, column data is transformed into a row format for transmission over the network.

When a request for data to be inserted into a columnar database is made, data is arranged into rows for transmission over the network to a server. At the server, the data received as rows is again transformed into columns before being stored. Similarly, when a query is for selecting data from a database, selected result-set data is transmitted as rows for display at a client. At the client, the received result-set is parsed and unstitched to fetch values corresponding to each row for display in the column format.

Thus, data processing in a column format requires not only, conversion and creation of an additional copy in a row format, but also requires mapping or re-configuration of data records of column format into row format and vice-versa. However, columnar storage is still preferred over row databases, as this allows for selective columns of tables to be processed.

Moreover, when data is retrieved on a client in a sequence, data is retrieved at a location that a cursor points to. For example, a cursor may point to each row of data being fetched and continue pointing to the given row until data corresponding to one or more columns is retrieved for that row. Since data corresponding to each of the columns is stored as a separate page, the same cursor would move to a number of different pages for a given row. After moving through all of the pages of a given row, the cursor moves to a second row. Consequently, additional processing at both server and client locations is required to support data retrieval, limiting the use of many applications. Additional processing is particularly limiting in situations where a large amount of data is required to be retrieved (or transferred) from the server, given limited network bandwidth and limited client cache.

SUMMARY

Generally, present invention embodiments provide a system which can boost migration such that communications between server and client locations are reduced and lead to enhanced performance, enhanced responsiveness for data storage, and enhanced data retrieval in the databases. In other words, present invention embodiments provide an efficient data retrieval process and transmission mechanism.

According to one embodiment of the present invention, a method is provided for improving processing of a received result-set. The method includes, receiving a query for generating a result-set including data selected from a database in response to the query, one or more cursors is associated with the result-set received in response to the query. The result-set is retrieved based on the one or more cursors.

According to another embodiment of the present invention, a computer program product for improving processing of a received result-set is provided. The computer program product comprises a non-transitory computer readable storage medium having program instructions embodied therewith. The program instructions are readable by a processor to cause the processor to perform a method. The method comprises: receiving a query for generating a result-set including data selected from a database in response to the query. One or more cursors is associated with the result-set received in response to the query. The result-set is retrieved based on the one or more cursors.

According to another embodiment of the present invention, a computer system for improving processing of a received result-set is provided. The computer system includes one or more computer processors, one or more computer readable storage media, and program instructions stored on the computer-readable storage media for execution by at least one of the one or more processors. The program instructions cause the at least one processor to perform a method comprising: receiving a query for generating a result-set including data selected from a database in response to the query. One or more cursors is associated with the result-set received in response to the query. The result-set is retrieved based on the one or more cursors.

BRIEF DESCRIPTION OF THE DRAWINGS

Through the more detailed description of some embodiments of the present disclosure in the accompanying drawings, features and advantages of the present disclosure will become more apparent, wherein the same reference generally refers to the same components in the embodiments of the present disclosure. The various features of the drawings are illustrations for clarity and not to scale.

DETAILED DESCRIPTION

Although the present invention describes various aspects in terms of a client device (source) and a server device (target), embodiments are not intended to be limited to client-server implementations. Rather, the disclosed operations may be applicable to any solution for displaying a result-set as retrieved from a database.

Figure 1:
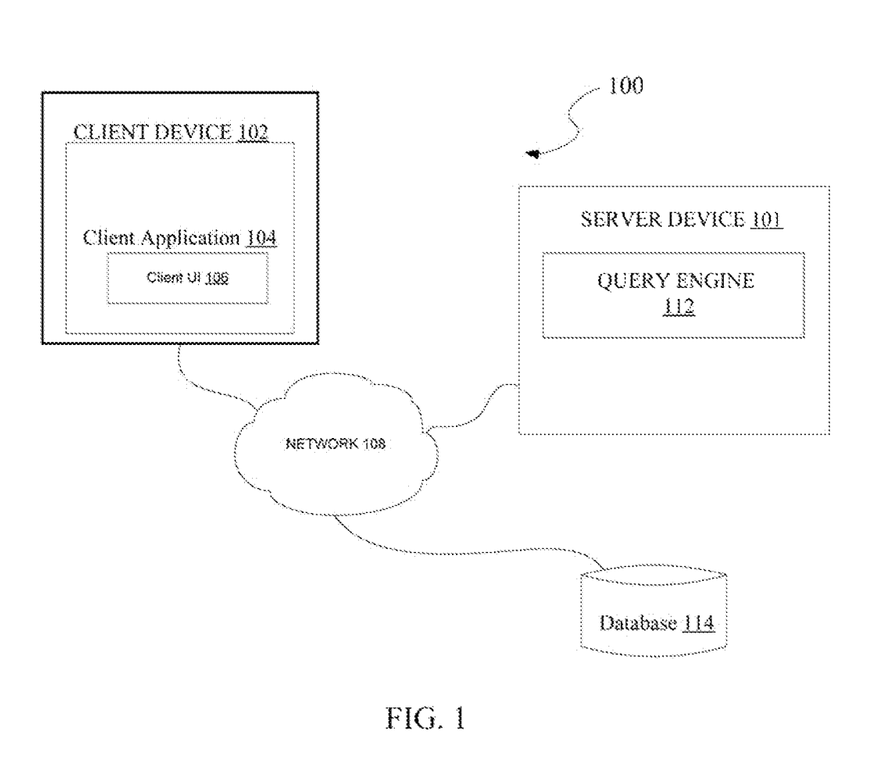
FIG. 1 is a block diagram illustrating a computing environment for data processing, in accordance with an embodiment of the present invention.

Present invention embodiments will now be described in detail with reference to the FIGS. FIG. 1 is a functional block diagram illustrating a computing environment, in accordance with an embodiment of the present invention. For example, FIG. 1 is a functional block diagram illustrating computing environment 100. Computing environment 100 includes server device 101, client device 102, and a database 114 connected over network 108. Computing device 101 includes query engine 112. Client device 102 includes client application 104.

Network 108 can be, for example, a local area network (LAN), a wide area network (WAN) such as the Internet, or a combination of the two, and may include wired, wireless, fiber optic or any other connection known in the art. In general, network 108 can be any combination of connections and protocols that will support communications between server device 101, client device 102, and database 114, in accordance with a desired embodiment of the present invention.

In various embodiments, server device 101 is a device that can be a standalone device, a server, a laptop computer, a tablet computer, a netbook computer, a personal computer (PC), or a desktop computer. In another embodiment, server device 101 represents a computing system utilizing clustered computers and components to act as a single pool of seamless resources. In general, server device 101 can be any computing device or a combination of devices with access to client device 102 and database 114, and with access to and/or capable of communicating with query engine 112. In one example, server device 101 may represent several computer systems linked together over a communication network (e.g., the Internet), allowing processing of data located at several locations. Server device 101 may include internal and external hardware components, as depicted and described in further detail with respect to FIG. 5.

In this exemplary embodiment, query engine 112 is stored on server device 101. In other embodiments, one or more of query engines 112 may reside on another computing (server) devices (not shown), provided that each can access and is accessible by each other, and provided that each can access the client device 102 and/or database 114. In yet other embodiments, query engine 112 may be stored externally and accessed through a communication network, such as network 108 by the server device 101, in one example query engine 112 may be remotely accessible.

In some embodiments, query engine 112 may search, modify, add and update database 114, for specific data requested by client device 102. In some embodiments, query engine 112 may provide the results of any query performed on the database 114, to the client device 102. In some embodiments, query engine 112 may communicate directly with the client device 102 through network 108. In yet other embodiments, query engine 112 may communicate with the client device 102 through server device 101.

A query process may be performed by the server device 101 and/or the query engine 112. This process generally comprises of following steps. The request for query is made at the client device 102 for searching database 114. Then, the query engine 112, and/or the server device 101, may build a custom search plan on the database 114, according to the request. Thereafter, the query engine 112 may execute a search of the database 114, according to the plan and generate results for the query in a separate data structure known as a result-set. The result-set may then be communicated to the requesting client device 102. In one implementation, the query may be parsed into series of operations, and the execution plan may be generated to carry out each of the operations separately. In some implementations, intermediate results may be sent back to query engine 112 for final aggregation of the result-set.

In various embodiments, client device 102 can be a laptop computer, a tablet computer, a netbook computer, a personal computer (PC), a desktop computer, a personal digital assistant (PDA), a smart phone, or any programmable electronic device capable of communicating with computing (server) device 101 via network 108. Client device 102 may include internal and external hardware components, as depicted and described in further detail with respect to FIG. 5.

Client device 102 includes a user interface (UI), client UI 106, which executes locally on client device 102 and operates to provide a UI to a user of client device 102. Client 102 may receive user input from a user via the provided client UI 106, thereby enabling a user to interact with client device 102. In one embodiment, client UI 106 provides an interface that enables a user of client device 102 to interact with the query engine 112 of server device 101 via network 108. In various examples, the user interacts with query engine 112 in order to communicate with database 114, view a result-set hosted by server device 101, and/or download a result-set from the server device 101. In one embodiment, client UI 106 is stored on client device 102. In other embodiments, client UI 106 is stored on another computing device (e.g., server device 101), provided that a user can access the client UI 106 and that the client UI 106 can interact with at least query engine 112.

In one embodiment, client device 102 includes a client application 104 that may include the client UI 106. In one example, client device 102 communicates with the server device 101 through the client application 104. In another example, client application 104 may concentrate on requesting input from users through client In 106, requesting desired data from the server device 101, and analyzing and presenting this data using the display capabilities of the client workstation or the terminal (for example, using graphics or spreadsheets). For example, in one embodiment, client application 104 submits database requests to the server device 101 using SQL statements. The database request may be generated by a user or may be any other client device. Once received, the SQL statement is processed by the server device 101, and the results are returned to the client application 104.

In relational databases, queries such as SQL are used in order to access data. In one embodiment, client application 104 is used to insert, select, modify, edit, and/or update database 114. The client application 104 may receive query input and allow for creation and sending of the query through client UI 106. A client application 104 may be configured to send data for storage into database 114 from client device 102.

A client application 104 may be configured to receive and retrieve data as a result-set from database 114 and/or server device 101, for the client device 102. In some embodiments, client application 104 may retrieve data as received in a result-set and display it through the client UI 106.

The result of a query is a result-set which has access to specific rows or columns of data from the database, for example, database 114. The result-set retrieved from the database 114 may exist in various forms. For example, the result-set may be a physical copy of data in the database 114 or may be a separate data structure comprised of pointers to data in the database 114. Regardless of the form, the result-set is a set of data from the database 114 that satisfies the search criteria of the client-initiated query. It is this result-set that must be communicated to the client that initiated the query.

The result-set is received in the client application 104 and displayed to a user of the client device 102. Internally, the client application 104, uses a cursor as a pointer to establish a known position within the result-set. The cursor is a data structure which represents a specific position within a result-set and permits rows to be processed one at a time, like processing consecutive records in a standard data structure. In one implementation, the cursor may be used to control data scrolling between server device 101 and client device 102 and/or client UI 106.

In some implementations, the cursor may be created and maintained at the client and/or server devices. For example, both the client and server devices may maintain metadata information pertaining to individual cursors. In one embodiment, when the client application 104 queries the database 114, the client application 104 may bind the cursors to commensurate with an expected result-set. In this way, the client application 104 maintains the cursors that contain information about the client's position within the result-set of returned data. In some embodiments, metadata information pertaining to cursors is maintained separately in memory of the client or server devices, respectively.

In one example, cursors may be generated automatically by the computing device or may be specifically defined by the user. In other words, cursors may be created explicitly or implicitly. Explicit cursors may be defined by a user by specifically declaring a cursor when generating a query. For example, when open, fetch, and close operations corresponding to the query are performed, cursors associate based on their description in the query. By comparison, implicit cursors are automatically created by the client application 104 based on the query.

In one embodiment, implicit cursors may be maintained by the client application 104. In one example, the client application 104 is enabled to configure on the number of implicit cursor's to be created for each query. The client application 104 may be further configured to open and close cursors after execution of each query. The client application 104 may be further configured to communicate with server device 101, to bind result-set data with each of the implicit cursors created in view of the query.

Database 114 is a data repository that may be written to and read by one or more of server device 101, query engine 112 and client device 102. Data may be stored to database 114. In some embodiments, database 114 may be written to and read by programs and entities outside of computing environment 100 in order to populate the repository with new data.

Database 114 may be stored on disk storage or in one or more accessible memory locations (not shown). For example, in a row database, each entry of a record may correspond to a column of the database while in a columnar database, each entry of the record may correspond to a row of the database. A row type database may be generally stored in a disk while a column type database may be generally stored in memory. When speed is a key performance metric, the database may be stored in memory, while other databases may be stored on disk storage. Additionally or alternatively, a database may also be located on a server and/or a cloud. Data may be stored using any suitable structure or data storage mechanism.

In one embodiment, databases may include different types of data, such as data files, media files, executable files, those used to implement software applications and operating systems, as well as files that are used or generated by such executable files, including files generated by user applications (e.g., word processing programs, email programs, graphics programs, database applications, or the like). In another example, data may include data in a registry and/or file system of a computing device. In one implementation, data can include data arranged as a plurality of data tables, as well as indexes and other structures that facilitate access to the data.

Data may be inputted and retrieved as a single, chunk or bulk data. When data is in bulk, it may be inputted/retrieved as blocks (sets of data grouped together). Data blocks require parsing of bulk data into smaller units called data blocks. In one example, parsing may be automatic or may be user defined. In one example, parsing may be automatic based on availability of network bandwidth.

In various examples, database 114 may reside on server device 101, client device 102, or another computing device (not shown). Generally, database 114 represents a data repository that is accessible by server device 101 and that may also be accessible by client device 102. In the depicted embodiment, database 114 is shown as a single unit that stores information about stored data. In another embodiment, database 114 represents multiple database units communicatively coupled with one another, which may be located at different locations (not shown). For example, database 114 may be synchronized with other storage (e.g., off-site storage) that maintains a backup of the data of database 114. In one example, such a backup may be updated in real time, periodically, at specified intervals, or otherwise.

In one example, data retrieved as result-set from the database 114, is displayed at the client device 102. In one example, data may be displayed at the client UI 106 of the client device 102 after the client application 104 fetches values of the result-set data at a predefined location of the client device 101. In one such example, the predefined location, can be user defined. In another example such predefined location can be memory or any other location, based on individual cursors. The details of one such display location at the client application 104 are explained in further details with reference to FIG. 4.

Figure 2:
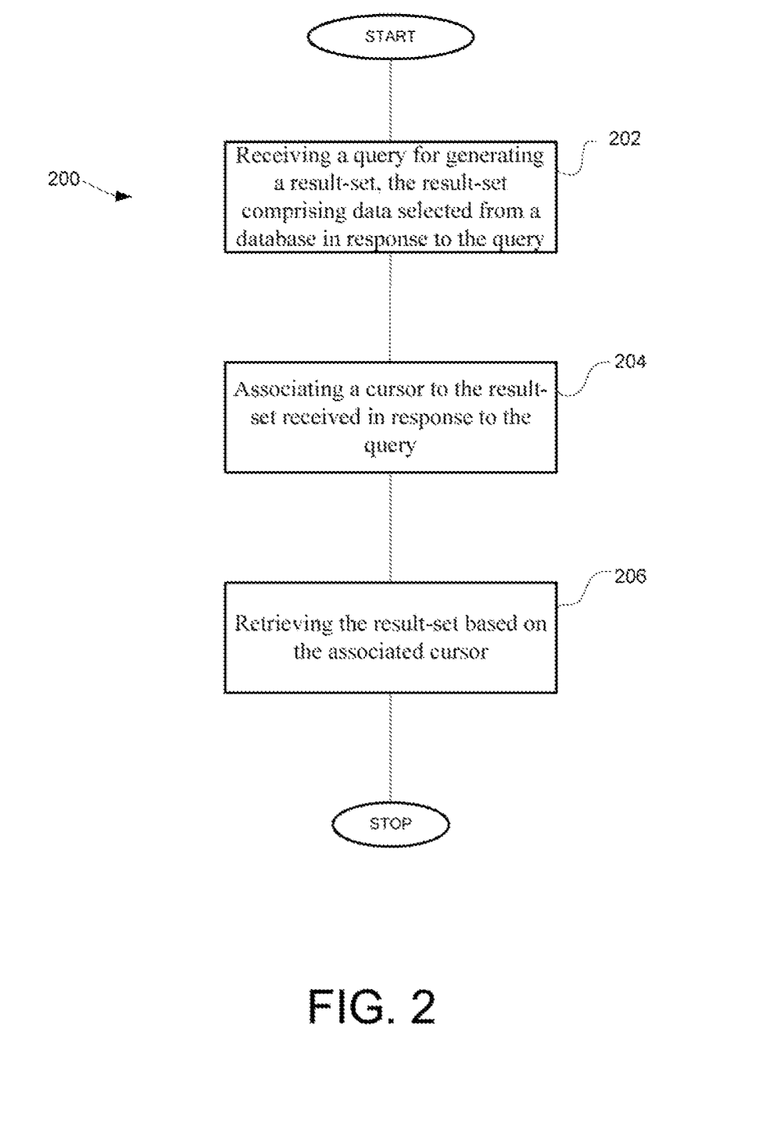
FIG. 2 is a flowchart depicting operations for data retrieval, on a computing device within the computing environment of FIG. 1, in accordance with an embodiment of the present invention.

FIG. 2 is a flowchart depicting operations for processing of data, on a computing device within the computing environment of FIG. 1, in accordance with an embodiment of the present invention. For example, FIG. 2 is a flowchart depicting data processing operations 200 of the client application 104 on the client device 102 within the computing environment 100.

The method for improving performance operations on the client application 104 and/or client device 102, comprises of following steps: in step 202, receiving a query for generating a result-set, the result-set comprising data selected from a database in response to the query; in step 204, associating a cursor by the computing device to the result-set received in response to the query; and in step 206 retrieving the result-set based on the associated cursor.

In step 202, a query is initiated at the client application 104. In one example, the query is initiated by a user of the client device 102.

The client application 104 transmits the query information to the server 101 and/or database 114 such that a result-set is generated based on the query. The result-set comprises of data selected from a database in response to the query.

In one such operation, client application 104, perhaps in response to a query initiated by a user, builds a data structure in its memory. The client application 104 may be configured to read through the query and identify respective attributes (columns) forming part of the query.

The client application 104 may declare application variables corresponding to the query. Application variables may determine a space for display of the result-set on the client device 102. In other words, application variables create pointers for result-set items and using these application variables, data in the result-set (items) can be accessed and processed for information. In one example, a number of application variables may correspond to the number of columns stated in the query. Client application 104 may be further configured to associate each of the application variables with each of the columns (attributes) declared in the query. In some implementations, client application 104 may store this information in memory of the computing device 102 (not shown).

In one implementation, the query may include information on the number of implicit cursors to be created. In one embodiment, the number may be defined based on the number of columns stated as part of the query. Information about a relation between each of the application variables, corresponding columns and the associated cursors is maintained in the memory. Based on the application variables, cursors are associated with columns. In some embodiments information regarding the associations may be stored in memory of the client device 102. In some implementations, all of the columns are simultaneously associated with application variables and cursors.

The client application 104 sends the query request to server device 101 through the client device 102. In some implementations, client application 104 may transmit metadata information pertaining to the association between application variables, columns, and/or cursors to the server device 101. Server device 101 receives the query through the use of network 108. Server device 101 further parses the query through the query engine 112 and begins the process of selecting data from database 114 for generating a result-set based on the query requested.

The data may be any type such as integer data, text strings. A query may be for a single piece of data or an array of data satisfying the query. The query is processed at the database 114. In databases, relevant records are scanned based on the query at least because columns of data may be stored across various databases and/or multiple tables. In some implementations, a query is processed on a column by column basis and corresponding data is scanned and searched based on the identified column. Query operations may also be performed on the database 114 based on the identified column. Still further, raw data may be serialized and value sequences may be copied and sent to query engine 112 based on the identified columns. In some implementations, selected columns in a given table are screened for a range of rows of a column based on the query. When a query is received, data blocks used by the query are read from the database 114 and loaded into the query engine 112 or buffer.

In one example, DBMS executes a query to generate a query result. The query result may reside in a cache. The result-set data comprises of the result data for particular operations performed while executing the query, such as a result of a table scan or table join and/or may comprise the final query result.

At the query engine 112 various datasets corresponding to each of the columns pertinent to the query are aggregated to generate a result-set. In one embodiment, metadata information pertaining to each of the columns is also retrieved from the database 114 for transmission to the client as part of the result-set.

Once the query result is populated with the data that complies with the client's query, server device 101 gathers the entire result-set from the query engine 112 and transmits the result-set over the network to client device 102 through the client application 104.

In some implementations, server device 101 may transmit result-set data as an array of rows to the client application 104. In another implementation, server device 101 may transmit result-set data column-wise to the client application 104. In another implementation, server device 101 may transmit result-set data corresponding to the one or more of the columns in parallel, to the client application 104.

In one embodiment, column-wise data from the result set is re-organized as columnized streams of data for transmission. In some embodiments, data from each of the columns is transmitted one after the other. In other embodiments, two or more columns may be combined together to transmit the result-set data. Such combinations for columns are dependent upon the bandwidth at which the data is being transmitted.

In one embodiment, data being transmitted over a network is synchronized across all columns to ensure that an equal number of rows corresponding to various columns may get transmitted over the network. In another embodiment, data values from each of the columns may be directly transmitted over the network. The process may be repeated until the entire result-set is transmitted.

In one implementation, server device 101 may transmit segments of data as a result-set to the client application 104. In one embodiment, the segmentation of result-set data may be determined by the server device 101 based on the number of columns of result-set data generated. In another embodiment, the segmentation may be based on the network available. In yet another embodiment, such segmentation may be based on blocks of data to be transmitted as batches together.

In some implementations, values of the result-set data are directly transmitted over the network. In some implementations, compressed data values may be serially transmitted over the network. In some example embodiments, the server device 101 may send resultant column values to the client application 104. In some embodiments, data corresponding to one or more columns may be transmitted in parallel. In some embodiments, data may be transmitted one after the other. In a few examples, the resultant column values are sent directly over the network without stitching them in a result-set row. Server device 101 and the client application 104 keep updating information on the data being transmitted corresponding to the result-set.

In some implementations, the result-set data which is transmitted as columns by the server device 101, is received as columns by the client application 104. In some example embodiments, data may be transmitted in a sequence of columns in the manner in which the data may be displayed at the client device 102.

At Step 204, one or more cursors are associated to the result-set received in response to the query.

In one of the embodiments, as the selected result-set is being transmitted as columns, and further the result-set is displayed as columns as well, there is no need to stitch columns together to get row values, as each column is stored on a different page and a SELECT statement can skip the pages for not required columns.

After the result-set data is received by the client application 104, the client application 104 may open a cursor corresponding to the result-set received. In one implementation, client application 104 may associate a client-side cursor to the received result-set. In another implementation, client application 104 associates client side cursors to each of the columns of the result-set data received.

In some implementations, the client application 104 may further bind respective cursors and the corresponding application variables to each of the columns of the result-set data received. Once the associated application variables are configured by the client application 104, the client application 104 may be further enabled to pass data directly from respective columns into each of the associated application variables at the client application 104. As a result, stitching and un-stitching rows may not be necessary.

In one implementation, the cursors that are bound to the application variables are implicit cursors.

At Step 206, the result-set is retrieved based on the associated cursor.

Once the client device 102 receives result-set data, then respective data values of each of the respective columns is retrieved into the corresponding associated variables. In one implementation, client device 102 receives segments of data in columns and based on the associated cursor, column values are correspondingly fetched into the respective associated variables.

As the client application moves through data (values and/or segments and/or columns) transmitted by server device 101, respective associated cursors continually update the client's current position. The cursor location indicates a current row position of client application column-wise within the transmitted segment. When values corresponding to entire column segments have been fetched into application variables, requests for additional data from the result-set may be made over the network.

After the data corresponding to the query has been received, cursors are closed by the client application 104.

The above embodiments and implementations may combine together and cross-reference, thereby resulting in more embodiments.

Figure 3:
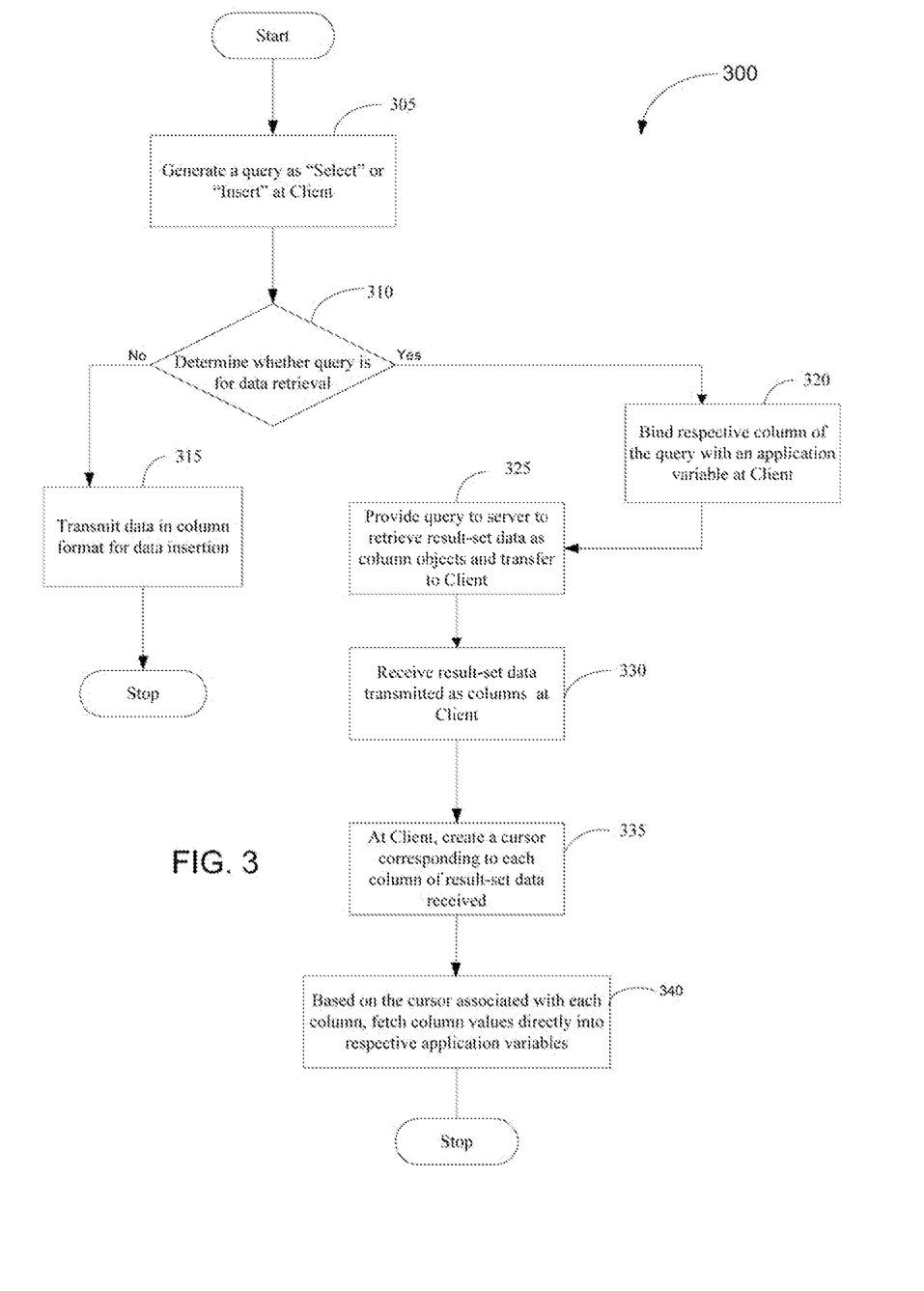
FIG. 3 is a flowchart depicting operations of an example implementation of a query process, on a computing device within the computing environment of FIG. 1, in accordance with an embodiment of the present invention.

FIG. 3 is a flowchart depicting operations for processing of data, on a computing device within the computing environment of FIG. 1, in accordance with an embodiment of the present invention. For example, FIG. 3 is a flowchart depicting operations 300 of client application 104 on client device 102 within computing environment 100.

At Step 305: Client application 104 receives a request from a user to generate a query. As examples, the query may be for selection of data from a database 114 or to store new data being generated at the client device 102 in the database 114.

At decision 310, client application 104 decides on the type of query. In particular, client application 104 determines whether query is for selection of data from the database or for storage of data in the database. When the client application 104 decides that the query is for retrieval of data, then client application 104 binds application variables to query statements (Yes branch 320). Alternatively, when the client application determines that the query is for insertion of data, client application 104 transmits data in a column format for data insertion (No branch 315).

More specifically, in some embodiments, client application 104 receives data at client device 102 in column format at step 315. Client application 104 transmits data for insertion to the server device 101. In one example, individual data is transmitted column-wise over the network to server device 101. In another example, client application 104 may transmit column values directly and/or serially over network to server device 101.

Alternatively, once columns of the query are bound with an application variable at step 320, the client application transmits the generated query to the server device 101 to retrieve result-set data from database 114 based on the query at step 325.

At Step 330, result-set data is received at the client application 104. In one implementation, server device 101 may transmit the result in column format back to the client application 104. In another implementation, client application 104 may transfer result-set in a row format to the client application 104. In some embodiments where the server device 101 transmits result-set data in columns, data values may be transmitted directly and serially over the network.

At Step 335: Based on the finding that the result-set data is received in column format, client application binds respective cursors with each of the columns of data received. In one embodiment, the received result-set includes metadata information about each of the columns.

At Step 340: Based on the cursor associated with each of the columns, values are directly fetched into the respective application variables.

Figure 4:
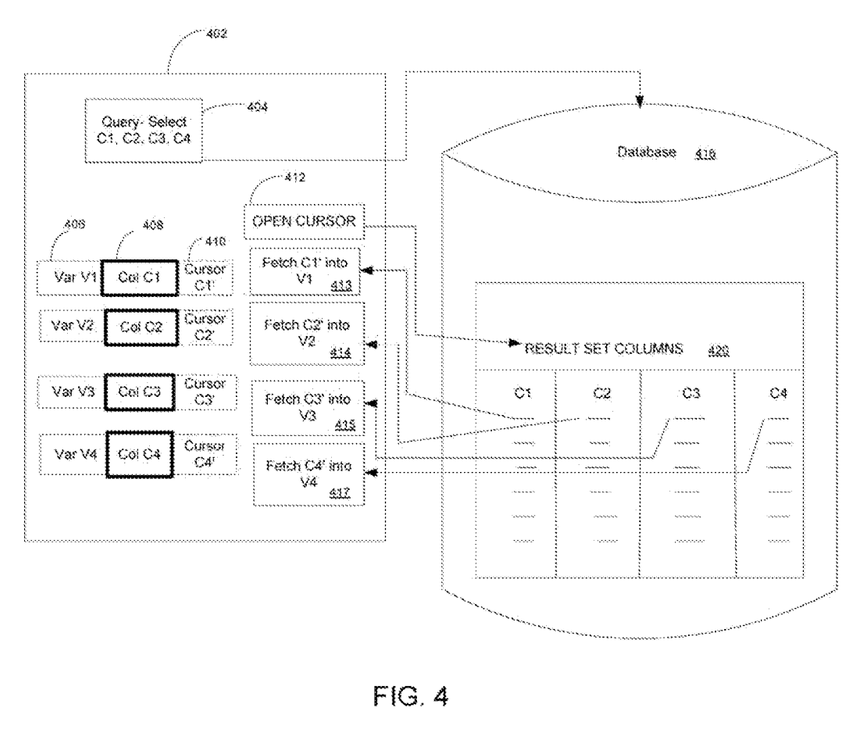
FIG. 4 is a block diagram of components of a computing device executing operations for data retrieval, in accordance with an embodiment of the present invention.

FIG. 4 illustrates an example process of transmission of result-set data to the client application 104 according to an embodiment of an invention. The example describes an execution process of fetching the result-set data, transmitted as columns to the client application 104.

Now referring to FIG. 4, an example embodiment of transmitting result-set data for four columns according to present invention embodiments is illustrated. However, the four columns are merely for simplicity of illustration since at least some present invention embodiments may apply to terabytes of data. Generally, when transaction data is recorded by computer systems, record-by-record, it is generally in time order of receiving the records. Thus, the data in effect has hundreds of thousands of rows, which correspond to each record.

In FIG. 4, a query 404 is generated at the client application 402. For example, query 404 may be for retrieval of data from database 416.

When the client application 402 invokes the query 404, the query expression that specifies the objects to query, the fields to retrieve, and any conditions that determine whether a given object qualifies are passed to the database 416. Moreover, based on the query 404, client application 402 configures on the number of application variables 406 that have to be created. In one embodiment, application variables 406 may be created in memory of client application 402.

In the embodiment depicted in FIG. 4, the client application 402 determines that the query 404 is for retrieval of a result-set based on a set of records, pertaining to data contained in four columns, i.e, C1, C2, C3, and C4. Correspondingly, the client application 402 generates an equivalent number of application variables Var V1, Var V2, Var V3 and Var V4. Client application 402 binds respective application variables Var V1, Var V2, Var V3 and Var V4, shown as 406 to individual columns Col C1, Col C2, Col C3, and Col C4 respectively, shown as 408, based on the query 404.

In one embodiment, cursors are being used to fetch data from database 416 into the client application 402 and also to identify a row in a table of the result-set. However, the client application 402 may also create an equivalent number of implicit cursors C1', C2', C3' and C4' indicated as 410 for the result set data. The implicit cursors C1', C2', C3' and C4' may be generated based on the number of columns in the query statement. In one implementation, the cursors may be implicitly identifiable.

As illustrated in FIG. 4, the client application 402 binds columns 408 (Col C1, Col C2, Col C3, and Col C4) to each of the application variables 402 (Var V1, Var V2, Var V3 and Var V4) and cursors 410, (C1', C2', C3' and C4') respectively. Such binding may happen before query request 404 is transmitted to the server device or database 416.

After the server device extracts the required result-set 420 from database 416, the server/database 416 builds the result-set columns as objects based on the query. In one such example, table data can be split into separate parts. The table data may contain fragments of data stored at different locations. Each fragment must contain a logical set of data. The data fragments may maintain data identifiable as row based or column based. In horizontal fragmentation data can be split by rows. In vertical fragmentation data can be split by columns. In columnar database, tables can be vertically fragmented by assigning specific columns to specific fragments.

In one embodiment, the server device 101 may further transmit result-set 420 as a single unit over a network. Alternatively, the result-set 420 may be split into respective columns C1, C2, C3 and C4 and the resultant column values from each of the respective columns C1, C2, C3 and C4 may be directly transmitted to the client application 402 without stitching into result-set rows. Once the column-wise data is sent over the network, stitching and unstitching corresponding record values may be unnecessary. Intermediary results may be joined together at a local level.

In one implementation, in order to reduce network communications, block fetch may be used. By block fetch, values as arrays for columns are transmitted as a single message, rather than a single value from each column being transmitted singularly. When block fetch is invoked, the retrieved columns are grouped into a large block of data. Block fetch allows large blocks of data to be transferred.

Once the result-set is received by the client application 402, client application 402 opens the cursor 412 to establish the result-set. In one example, when the cursor is opened, the cursor is already positioned on a row by means of FETCH statement.

In the illustrated example, after the open cursor request is made by the client application 402, respective cursors are opened and identified with corresponding data being fetched. Data corresponding to each of the columns C1, C2, C3 and C4 is retrieved into specific application variables Var 1, Var 2, Var3 and Var 4 at locations 413, 414, 415, and 417 associated with the respective cursors C1', C2', C3' and C4'. In the example embodiment, data is fetched into locations specified by application variables Var 1, Var 2, Var3 and Var 4. In one embodiment, data may be fetched into each of the respective locations 413, 414, 415, and 417 respectively, one after the other. In another embodiment, data may be fetched into each of the respective locations 413, 414, 415, and 417 respectively, in parallel. In yet another embodiment, data may be fetched into each of the respective locations 413, 414, 415, and 417 respectively, in parallel and simultaneously. The cursors are not closed until all result-set data is fetched. After the entire result-set is fetched into the respective application variables, each of the associated cursors may be closed.

The various embodiments implementing the method have been described with respect to accompanying drawings. Those skilled in the art may understand that the method may be implemented in software, hardware or combinations of software and hardware. Moreover, those skilled in art may understand that by implementing various steps of the above method in software, hardware or combinations of software and hardware, an environment 10 may be provided in which example embodiments of the inventive subject matter may be practiced as shown.

Figure 5:
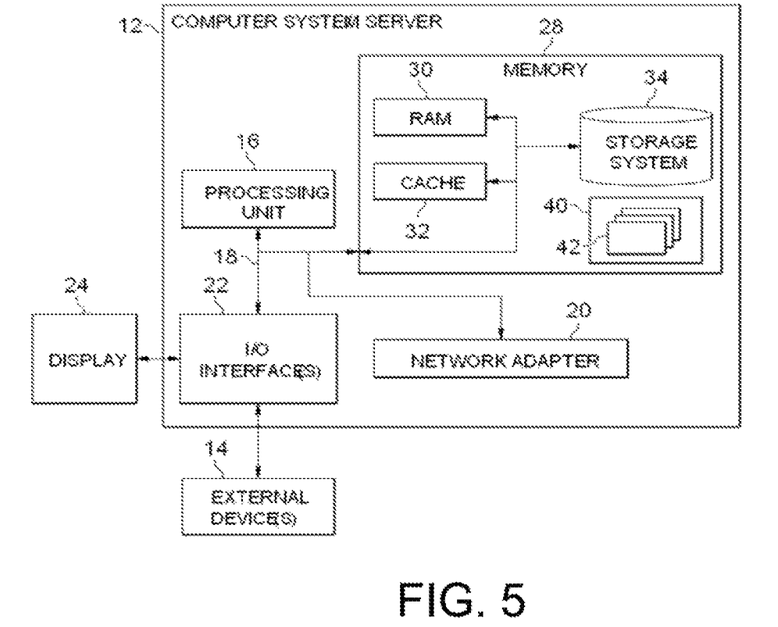
FIG. 5 is a functional block diagram illustrating a computing environment, in accordance with an embodiment of the present invention.

Referring now to FIG. 5, in which a block diagram of an exemplary computer system/server 12 which is applicable to implement the embodiments of the present invention is shown. Computer system/server 12 shown in FIG. 5 is only illustrative and is not intended to suggest any limitation as to the scope of use or functionality of embodiments of the invention described herein.

As shown in FIG. 5, computer system/server 12 is shown in the form of a general-purpose computing device. The components of computer system/server 12 may include, but are not limited to, one or more processors or processing units 16, a system memory 28, and a bus 18 that couples various system components including the system memory 28 and the processing units 16.

Bus 18 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown in FIG. 5 and typically called a "hard drive"). Although not shown in FIG. 5, a magnetic disk drive for reading from and writing to a removable non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc., one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Some preferable embodiments have been described in more detail with a reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

In view of the aforementioned features, embodiments of the present invention may provide multiple cursors (pointers) pointing to relevant columns individually, which may allow different columns to be accessed simultaneously and quicker than cursors that traverse data row by row. Consequently, present invention embodiments allow processing batches of rows in each of the distinct columns which may enhance processing speeds. Moreover, present invention embodiments may not require transformation processes at server and client devices, respectively, and may eliminate the requirement of creating additional copying of data in another format before and after transmission process and get unblocked access to data. This may lead to storage locations to be directly identified for query operations and save overhead.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++, JavaScript, objective C and C#, or the like, and conventional procedural programming languages, such as the "C" programming language or similar programming languages.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The term(s) "Smalltalk" and the like may be subject to trademark rights in various jurisdictions throughout the world and are used here only in reference to the products or services properly denominated by the marks to the extent that such trademark rights may exist.

The descriptions of the various embodiments of the present invention have been presented for purposes of illustration, but are not intended to be exhaustive or limited to the embodiments disclosed. Many modifications and variations may be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for processing of a received result-set, the method comprising:
    receiving a query for generating a result-set including data selected from a columnar database in response to the query;
    associating a plurality of database cursors with the result-set generated in response to the query, wherein each database cursor indicates a location of data of the result-set in storage; and
    retrieving the data from the result-set based on the plurality of database cursors, wherein the data from the result-set is retrieved in a columnar format and the data serially corresponds to each column of the result-set, and wherein the data of the result-set associated with each of the database cursors is retrieved in parallel.

2. A computer program product for processing of a received result-set, the computer program product comprising a non-transitory computer readable storage medium having program instructions embodied therewith, the program instructions readable by a processor to cause the processor to perform a method comprising:
    receiving a query for generating a result-set including data selected from a database in response to the query;
    associating a plurality of database cursors with the result-set generated in response to the query, wherein each database cursor indicates a location of data of the result-set in storage; and
    retrieving the data from the result-set based on the plurality of database cursors, wherein the data from the result-set is retrieved in a columnar format and the data serially corresponds to each column of the result-set, and wherein the data of the result-set associated with each of the database cursors is retrieved in parallel.

3. A computer system for processing of a received result-set, the computer system comprising:
    one or more computer processors;
    one or more computer readable storage media;

program instructions stored on the computer readable storage media for execution by at least one of the one or more processors, the program instructions causing the at least one processor to perform a method comprising:
- receiving a query for generating a result-set including data selected from a database in response to the query;
- associating a plurality of database cursors with the result-set generated in response to the query, wherein each database cursor indicates a location of data of the result-set in storage; and
- retrieving the data from the result-set based on the plurality of database cursors, wherein the data from the result-set is retrieved in a columnar format and the data serially corresponds to each column of the result-set, and wherein the data of the result-set associated with each of the database cursors is retrieved in parallel.

4. The method of claim 1, wherein the columnar format includes at
least one column, and each column of the result-set is associated with at least one of the plurality of database cursors, each database cursor being an implicit database cursor.

5. The computer program product of claim 2, wherein the columnar format includes at least one column, and each column of the result-set is associated with at least one of the plurality of database cursors, each database cursor being an implicit database cursor.

6. The computer system of claim 3, wherein the columnar format includes at least one column, and each column of the result-set is associated with at least one of the plurality of database cursors, each cursor being an implicit database cursor.

7. The method of claim 4, further comprising:
synchronizing each of the implicit database cursors with any associated columns of the result-set.

8. The computer program product of claim 5, wherein the method further comprises:
synchronizing each of the implicit database cursors with any associated columns of the result-set.

9. The computer system of claim 6, wherein the method further comprises:
synchronizing each of the implicit database cursors with any associated columns of the result-set.

10. The method of claim 7, further comprising:
fetching the data associated with the same implicit database cursor into a variable.

11. The computer program product of claim 8, wherein the method further comprises:
fetching the data associated with the same implicit database cursor into a variable.

12. The computer system of claim 9, wherein the method further comprises:
fetching the data associated with the same implicit database cursor into a variable.

* * * * *